(12) United States Patent
Benit

(10) Patent No.: US 6,612,064 B2
(45) Date of Patent: Sep. 2, 2003

(54) MANUAL/AUTOMATIC CASTING MECHANISM

(76) Inventor: Bradley John Benit, 15679 250th Ave., Spirit Lake, IA (US) 51360

( * ) Notice: Subject to any disclaimer, the term of this patent is extended or adjusted under 35 U.S.C. 154(b) by 165 days.

(21) Appl. No.: 09/909,533

(22) Filed: Jul. 20, 2001

(65) Prior Publication Data

US 2003/0014898 A1 Jan. 23, 2003

(51) Int. Cl.$^7$ .............................................. A01K 91/02

(52) U.S. Cl. ........................................................ 43/19

(58) Field of Search .......................... 43/19, 21.2, 25, 43/4.5; 242/239, 311, 312, 323

(56) References Cited

U.S. PATENT DOCUMENTS

| | | | | | |
|---|---|---|---|---|---|
| 3,703,262 | A | * | 11/1972 | Menne | 242/84.2 A |
| 4,566,217 | A | * | 1/1986 | Geary, Sr. | 43/19 |
| 4,656,773 | A | * | 4/1987 | Klefbeck | 43/18.1 |
| 4,976,439 | A | * | 12/1990 | Kraemer | 273/350 |
| 5,210,972 | A | * | 5/1993 | Collins | 43/25 |
| 5,695,139 | A | * | 12/1997 | Murphy | 242/239 |

* cited by examiner

Primary Examiner—Charles T. Jordan
Assistant Examiner—Bret C Hayes
(74) Attorney, Agent, or Firm—Schwegman, Lundberg, Woessner & Kluth, P.A.

(57) ABSTRACT

A rod and reel combination which may be configured for normal casting or for automatic casting. For automatic casting the rod is flexed by turning the reel crank and the cast is made by pressing the thumb button to free the line as the kinetic energy stored in the flexed rod is imparted to the weight.

6 Claims, 7 Drawing Sheets

MANUAL/AUTOMATIC CASTING MECHANISM

TECHNICAL FIELD OF THE INVENTION

The present invention relates generally to the field of casting mechanisms for fishing rods and reels and particularly to a novel and improved method and means for manually or automatically casting fishing line off of a reel. A reel according to the invention can function as a conventional spincasting reel as well as a reel for performing an automatic cast in response to pressing a thumb button,

BACKGROUND OF THE INVENTION

There are a number of mechanisms that have been devised for casting fishing line from a rod and reel. In conventional bait casting the fisherman draws the rod back and accelerates the rod tip forward to impart momentum to the lure or other object to which the line is tethered. Depending upon the nature of the reel that is used, it may also be necessary for the fisherman to operate a brake or other device on the reel to restrain the reel from dispensing line during the initial casting movement and to release the line once the forward momentum of the rod has been imparted to the lure.

When a spincasting reel is used for casting, the fisherman begins the cast with the line restrained from movement out of the reel housing by a snubbing action typically controlled by thumb pressure on a thumb button. When the forward motion of the reel tip reaches the point where it is desired that the lure should leave the rod and begin its trajectory, the fisherman's thumb is removed from the thumb button and the line is freed from the snub brake that restrained it, typically between the front cover of the reel and the inner rotor mechanism. It has been found that the casting procedure requires some skill and coordination and may not be immediately undertaken by novices, particularly younger children.

It is therefore proposed to provide a modified spincasting reel which is operable in one configuration for performing casts in the conventional manner but which also is operable, in a modified configuration, to allow the user to wind the fishing line so tightly that the end of the rod is drawn back and cocked in the manner of a bow which may then be "fired" to cast the weight and line by actuation of a release button on the reel to free the line, thereby allowing the flexed rod to return to its extended "normal" position while accelerating the weight, thereby automatically casting the weight and line away from the fisherman.

Such "automatic" operation is something that can be easily mastered by a child or novice fisherman. It also allows use of the rod and reel combination as a game device by allowing "automatic" casting of a weight toward a target. The line is retrieved and the rod tip is again flexed by using the reel crank in the normal manner to draw the tip of the rod, bending it into a "bow" to store the energy to perform the next automatic casting operation when the thumb button is depressed.

The reel according to the present invention may also be used to perform casting operations in the normal manner when the reel is switched to its other configuration where the thumb button actuates the line brake at the beginning of the cast and is released to complete the cast. The line is then retrieved in the normal manner by turning the crank. Modifications to the rod structure may optimize its functionality for performing automatic casts.

While there are a number of add-on casting mechanisms that have been devised for casting fishing line which rely on using something other than a normal casting method and apparatus; most of those involve the use of other mechanisms to propel the lure and line. In the present invention, a rod and reel which may also be used for normal casting, are adaptable for performing the automatic casting as well.

For the reasons stated above, and for other reasons stated below which will become apparent to those skilled in the art upon reading and understanding the present specification, there is a need in the art for a rod and reel for carrying out automatic casting as well as conventional casting.

SUMMARY OF THE INVENTION

The above mentioned problems with casting using conventional spincasting rods and reels and other problems are addressed by the present invention and which will be understood by reading and studying the following specification. A rod and reel combination is described which provides, in one configuration, for automatic casting by pressing a button on the reel.

In particular, an illustrative embodiment of the present invention provides, in a fishing reel having a rear housing, a spool to hold a quantity of fishing line, a crank rotatably mounted on the housing and a rotor mounted on a shaft projecting through the spool, the rotor coupled to the crank for rotation by the crank and having a having a pickup pin extendable therefrom as the crank is rotated for engaging the fishing line and depositing it on the spool. The reel also has a front cover attachable to the rear housing to enclose the spool and rotor, the cover having an opening through which fishing line may be fed to and from the spool, a thumb button mounted on the housing and coupled for moving the shaft and rotor to retract the pickup pin into the rotor and to snub line between the rotor and the front cover and provides an improvement having a switch mounted on the rear housing for limiting movement of the thumb button and the rotor to retract the pick up pin into the rotor without snubbing the line against the front cover.

In particular, an illustrative embodiment of the present invention also includes a fishing reel with a rear housing, a spool to hold a quantity of fishing line, a crank rotatably mounted on the housing, a rotor mounted on a shaft projecting through the spool, the rotor coupled to the crank for rotation by the crank and having a having a pickup pin extendable therefrom as the crank is rotated for engaging the fishing line and depositing it on the spool. The reel also has a front cover attachable to the rear housing to enclose the spool and rotor, the cover having an opening through which fishing line may be fed to and from the spool and a thumb button mounted on the housing and coupled in one configuration for moving the shaft and rotor to retract the pickup pin into the rotor and to snub line between the rotor and the front cover and coupled in another configuration to permit only limited movement of the thumb button and the rotor to retract the pick up pin into the rotor without snubbing the line against the front cover.

In another illustrative embodiment of the present invention a rod and reel has a fishing rod having an eyelet at a distal tip thereof, a spin casting reel mounted on the rod and displaced from its distal tip, the reel adapted for retrieving and discharging a fishing line having a weight at one end thereof through the eyelet, the reel constructed and arranged for retrieving the fishing line until the weight reaches the eyelet and then causing the rod to bend with the distal tip being drawn toward the reel. In that embodiment the reel is also constructed and arranged for releasing the line by pressing a thumb button to momentarily release the line and dispense line as the bend in the rod is removed and the momentum of the weight propels the weight and the fishing line to which it is attached away from the rod and reel.

Additionally a method embodiment of the present invention includes attaching the weight to the end of a fishing line from a fishing reel and passing through an eyelet at the end of the rod, retrieving the fishing line to draw the weight against the eyelet and bend the rod tip toward the reel, releasing the tension on the fishing line by pressing a thumb button to remove the tension on the fishing line and allow the rod to unbend and the momentum of the weight to propel it from the rod while pulling line from the reel.

DETAILED DESCRIPTION OF THE INVENTION

In the following detailed description of the preferred embodiments, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
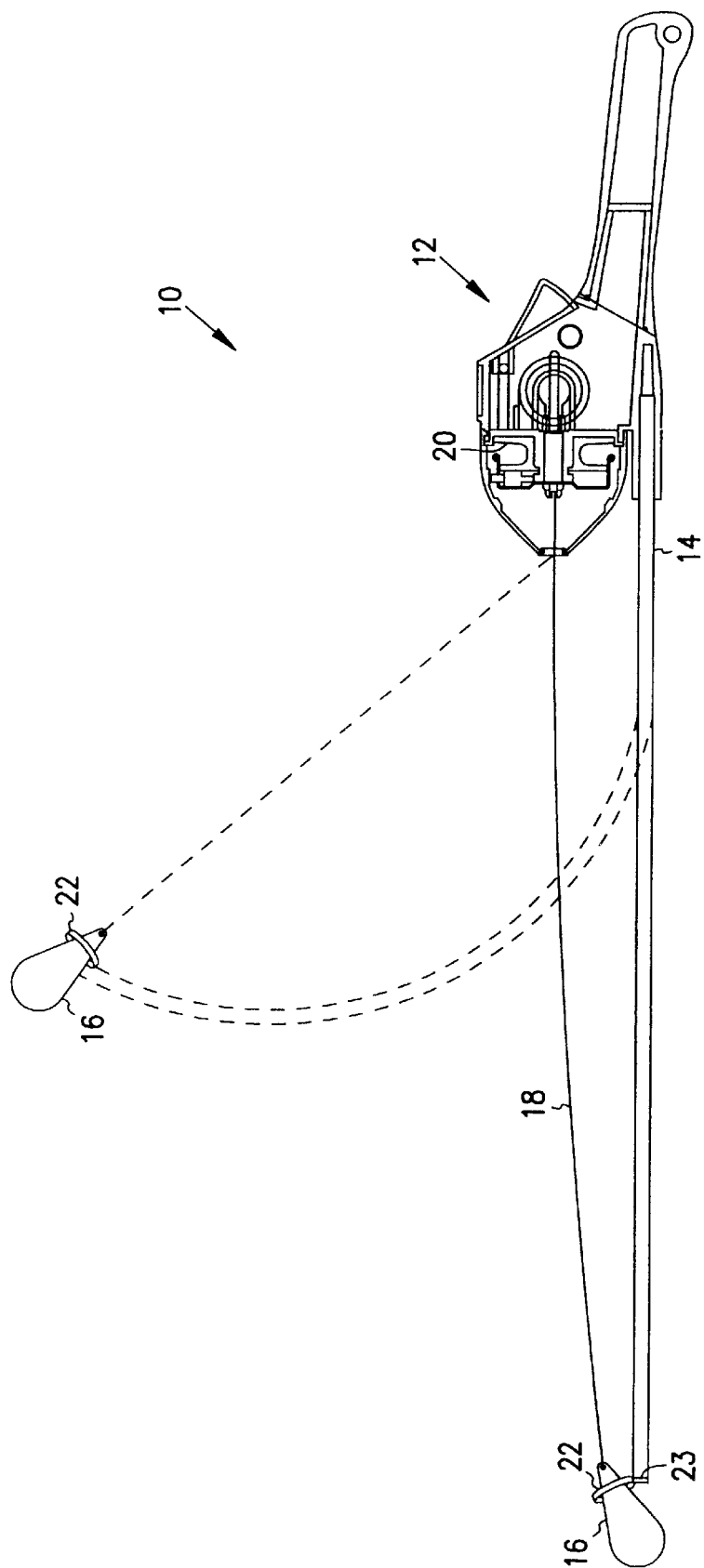
FIG. 1 is a side cross elevation view, partially in cross section, of a rod and reel according to the present invention, illustrating in phantom outline, the position of the rod and line prior to making an "automatic" cast.

In FIG. 1, a rod and reel 10 in accordance with the present invention is shown. A closed face spincasting reel 12 according to the present invention is shown mounted on a suitable fishing rod 14. A weight 16 is attached to the end of a fishing line 18, the remainder of which is retained on spool 20 within reel 12. Line 18 passes through at least one tip top or eyelet 22 which is secured to the tip of rod 14 by a band 23. Weight 16 has a size which is sufficient compared to the interior circumference of eyelet 22 so that it does not pass through it. In one embodiment weight 16 may have a tear drop shape with a tapered narrow top portion to which line 18 may be attached.

When line 18 continues to be wound onto spool 20 by use of the crank (not shown) on reel 12, the force bends the eyelet 22 at the tip of rod 14 upward and toward reel 12 as shown in phantom form in FIG. 1. In one embodiment of the invention, at least a portion of the tapered narrow top portion of weight 16 may project into the opening of eyelet 22 to secure stabilize it relative to rod 14 during automatic casting. In one embodiment, eyelet 22 may be angled downwardly, toward the longitudinal axis of rod 14 to facilitate the positioning of weight 16 when the rod is in the flexed position from which automatic casting occurs.

Figure 2:
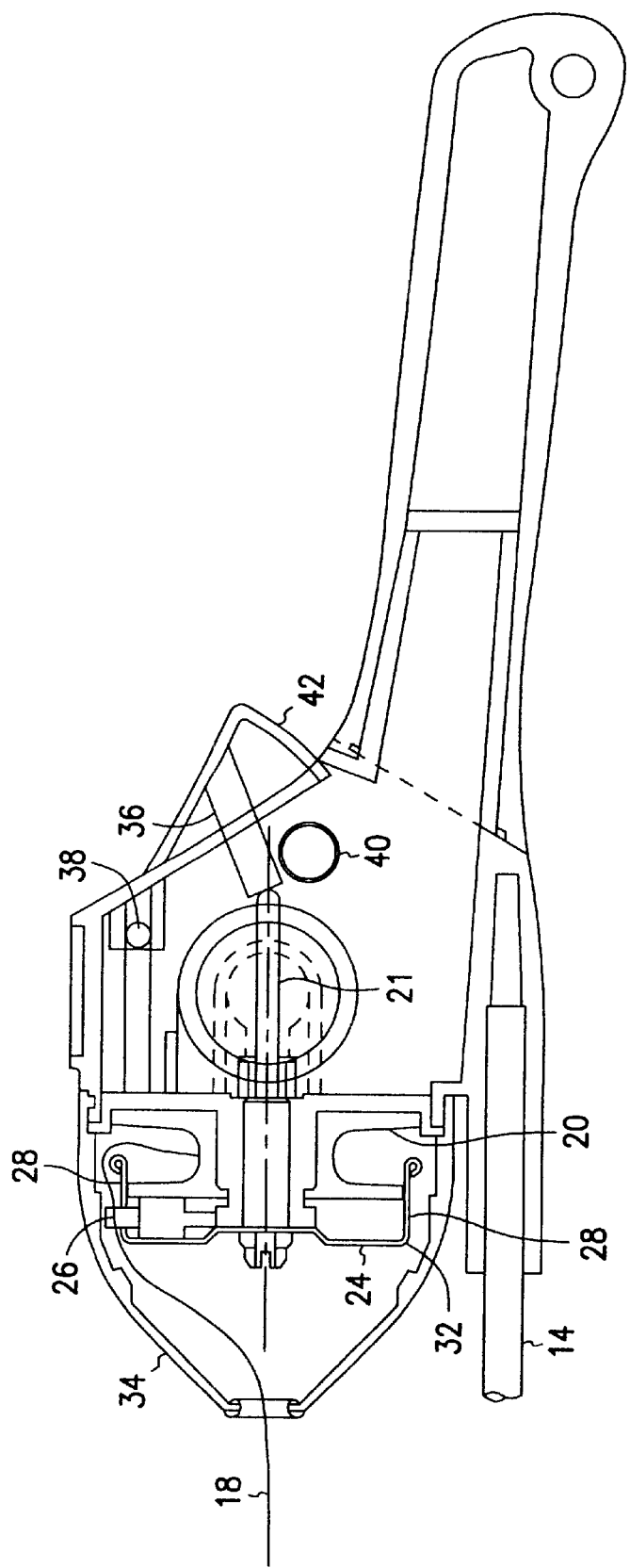
FIG. 2 is a detailed cross-sectional view showing portions of the interior of the spincasting reel of FIG. 1.

In the more detailed view of FIG. 2, the structure of reel 12 may be seen more clearly. The fishing line 18 is wound around spool 20 by the rotor 24 as it is rotated by turning the crank which in turn rotates shaft 26 on which rotor 24 is mounted. A retractable pick up pin 28 is shown projecting from side face 28 of rotor 24. As rotor 24 is rotated on shaft 26, pin 28 engages fishing line 18 and winds it on spool 20 which remains stationary.

In normal casting operation, thumb button 30 is pressed in order to brake the unreeling of line from spool 20. The braking action when reel 12 is configured for normal operation is accomplished, as it is in conventional spincasting reels by pinching the line between the rotor edge 32 and the inner wall of forward cover 34 as rotor 24 is moved forwardly toward the rod tip in response to arm 36 of thumb button 30 as button 30 is rotated about pivot 38. When reel 12 is configured for normal operation, thumb button 30 is free to pivot without restriction on its movement other than the resistance from shaft 26 as rotor 24 comes into contact with the inner surface of front cover 34.

In the "automatic" or button actuating casting mode, reel 12 is reconfigured by moving switch 40 into a position where it engages another arm 42 of thumb button 30 to limit the extent of the rotational movement of thumb button 30 so that when button 30 is depressed to the maximum permitted by switch 40, the forward travel of rotor 24 is limited so as to prohibit it from pinching line 18 between rotor 24 and front cover 34. The limited forward movement is sufficient, however, to retract pin 26 and allow release of line 18. When the crank of reel 12 is rotated to draw line 18 in sufficiently to move weight 16 snugly against eyelet 22, the tension on line 18 against extended pin 26 is sufficient to hold rod 14 in the bowed position shown in FIG. 1 until the thumb button is pressed to commence an automatic cast.

Figure 3:
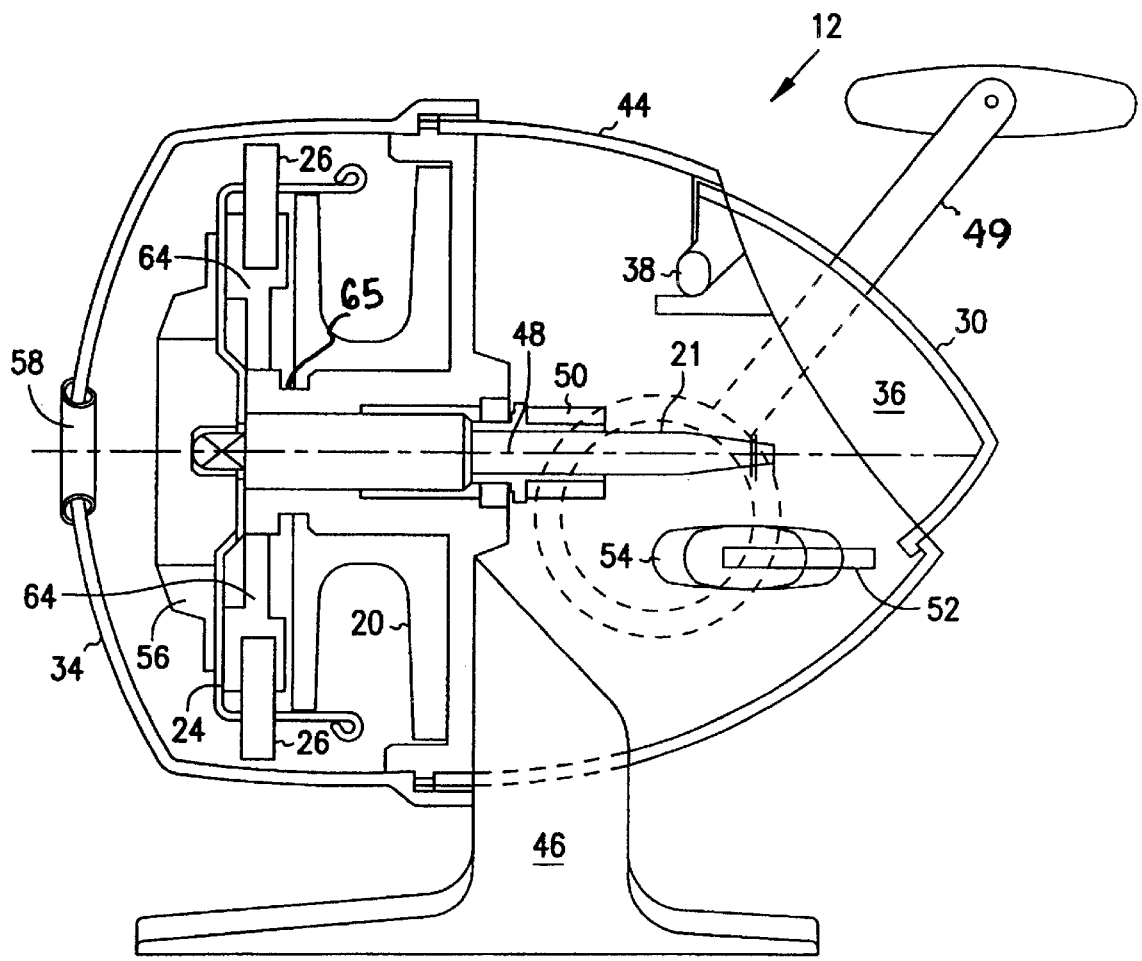
FIG. 3 is a cross sectional view of a spincasting reel according to the present invention showing portions of the internal structure including the switch that converts between automatic casting and normal operation of the reel.

FIG. 3 shows further detail of another embodiment of a casting reel 12 according to the present invention. A rear housing 44 which is secured to a reel frame 46 encloses the rear portion of shaft 21. Shaft 21 is mounted for rotational movement around its axis 48 in response to rotation of a crank 49. The shaft is also supported for translational movement along axis 48 by suitable bearings 50. A rotor 24 is secured to one end of shaft 21 while the other end is engaged by an arm 36 which projects from an inner face of thumb button 30. The pivotal motion of thumb button 30 about axis 38 which is secured to rear housing 44 may be restrained by a projection 52 of a switch 54 which is slidable along an axis generally parallel to axis 48 of shaft 21 between two positions.

In a first position, switch 54 does not provide any limit on the travel of thumb button 30 and shaft 21 so that a projecting portion 56 of rotor 24 will, when thumb button 30 is fully depressed, pinch line passing through aperture 58 of forward cover 34 between the inner face of cover 34 and projecting rotor portion 56.

In a second position, switch 54 is moved to the rearward position shown in FIG. 3 in phantom outline. In that position, projection 52 blocks movement of thumb button 30 beyond a certain point so that line 18 is not braked between the projecting portion 56 of rotor 24.

Reel 12 of FIG. 3 rewinds line 18 onto spool 20 as pick up pins 28 engage line 18 as shaft 21 is rotated about axis 48 by crank 49. During the preloading of the rod and reel combination prior to an automatic casting operation, the tension on line 18 as the tip of rod 14 is bowed toward reel 12, pick up pins 28 remain projecting from rotor 24 and hold the tension on line 18 until the automatic cast is made by pressing thumb button 30.

Figure 4:
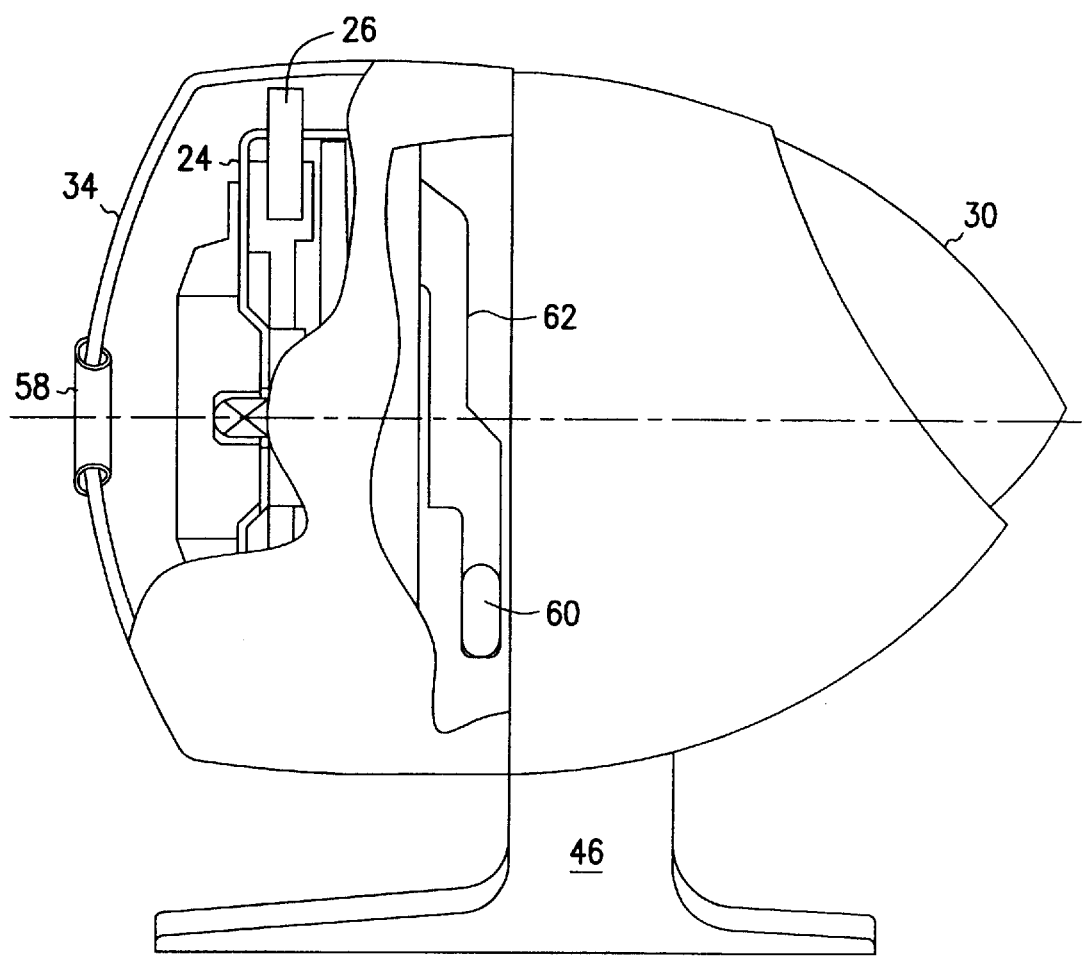
FIG. 4 is a cross sectional view of another embodiment of a spincasting reel according to the present invention showing portions of the internal structure including an adjustable front cover structure that converts between automatic casting and normal operation of the reel.

FIG. 4 illustrates another embodiment of a reel in accordance with the present invention. In this embodiment there is no switch for selectively limiting movement of the thumb button 30 to switch between the normal casting and automatic casting modes. Instead, the switching of modes is provided by a front cone 34 which may be adjusted to have separate positions for normal casting and for automatic casting. The adjustment of cone 34 is accomplished by twisting it to position a lobe 60 which is secured to frame 46 and in one of two positions along a cam track 62 which is attached to the inner surface of front cover 34. When lobe 60 is in the position shown in FIG. 4, rotor 24 and projection 56 are biased away from the inner surface of front cover 34. By rotating cone or cover 34 relative to frame 46 until lobe 60 reaches the position on cam track 62 shown in phantom outline on FIG. 4, operation of the thumb button 30 will operate the reel in the normal manner by pressing the projection 56 of rotor 24 against cover 34.

Figure 5:
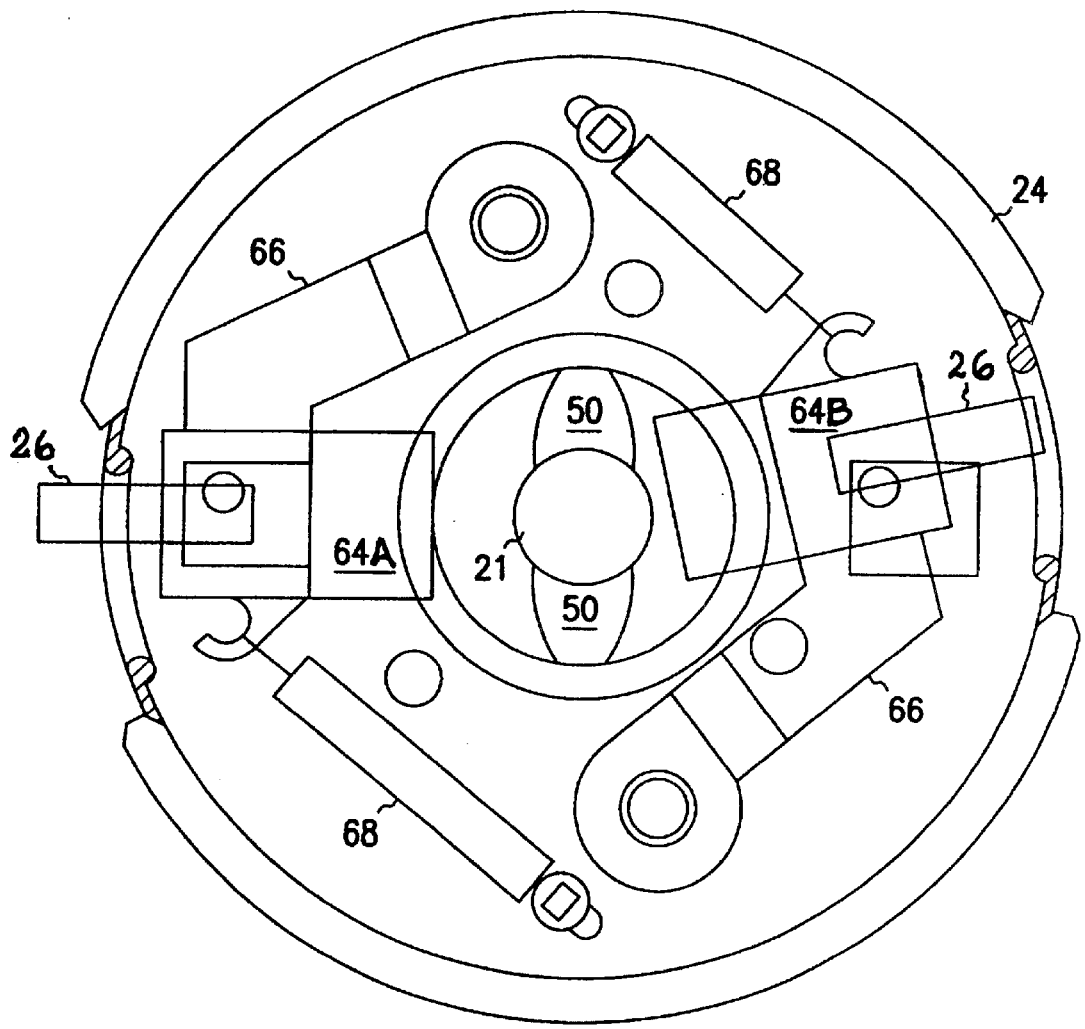
FIG. 5 is an elevation view of a portion of the rotor assembly of a reel which shows details of the operation of the pickup pin that projects from the spinning rotor during line retrieval to wind the line on the reel spool.

FIG. 5 is a partial cross sectional view of a reel 12 as shown in FIG. 3 or 4 showing the rotor 24 and, in phantom outline, some details showing the operation of the pick up pins 26. As can best be seen in FIG. 3, Pin holders 64 hold pick up pins 28 at one end thereof and have cam followers at the other end thereof which bear upon shaft 21 as shown. As shaft 21 is advanced by pressing thumb button 30 and shaft 21 moves toward cover 34, pick up pins 26 are retracted as pin holders 64A and 64B drop into slot 65. In FIG. 5, holder 64A is shown in the line retrieving position and the other holder 64B is shown in the retracted, casting position. Swing arms 66 and bias springs 68 move the pick up pins into the retrieve mode commenced by turning crank 49 and to the casting mode as the rotor 24 is moved toward cover 34 by thumb button 30.

Figure 6A:
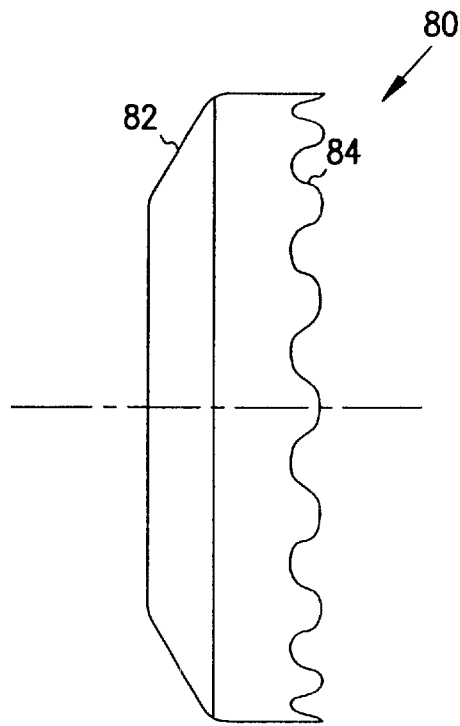
FIG. 6 is an alternative configuration for a rotor assembly for use in a reel in accordance with the present invention.
Figure 6B:
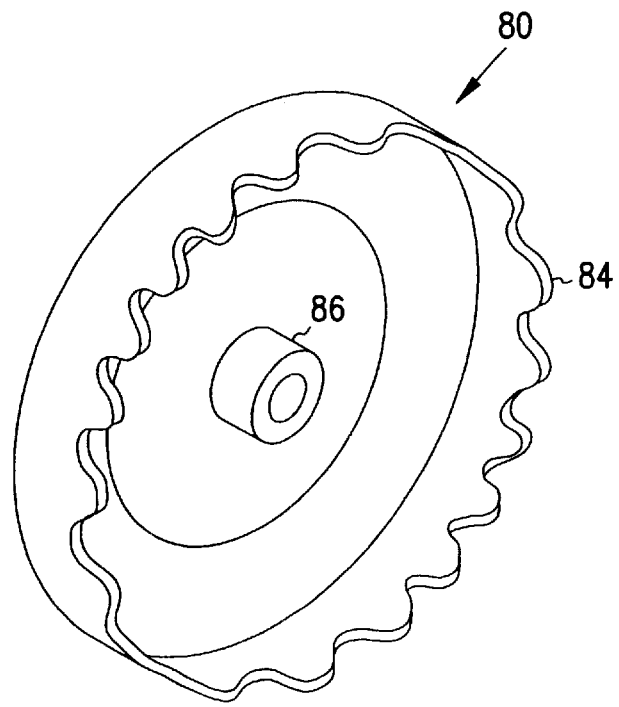

FIGS. 6A and 6B illustrate a side and perspective view, respectively, of an embodiment of a rotor 80 which does not include the pick up pins 28 used on rotor 24. A series of arcuate cusps 84 are formed along an edge of rotor 80 and are positioned to engage line 18 as rotor 80 is rotated about a shaft 21 which passes through hub 86. As the rotor is rotated, the line is wound onto spool 20. When the rotor moves partially forwardly along the axis 48, it releases line 18 from cusps 84 and allows the line to freely unwind from spool 20. When the rotor is moved fully forwardly along the axis 48, it pinches line 18 between the rotor edge 82 and the inner surface of the housing. When a cast is made using rotor 80, the reel is cranked by rotating handle 49 to "cock" the rod by flexing it. The line is trapped by the brake formed between rotor surface 82 and the housing and the cast is made by depressing switch 40 to release the line and make the automatic cast.

Figure 7:
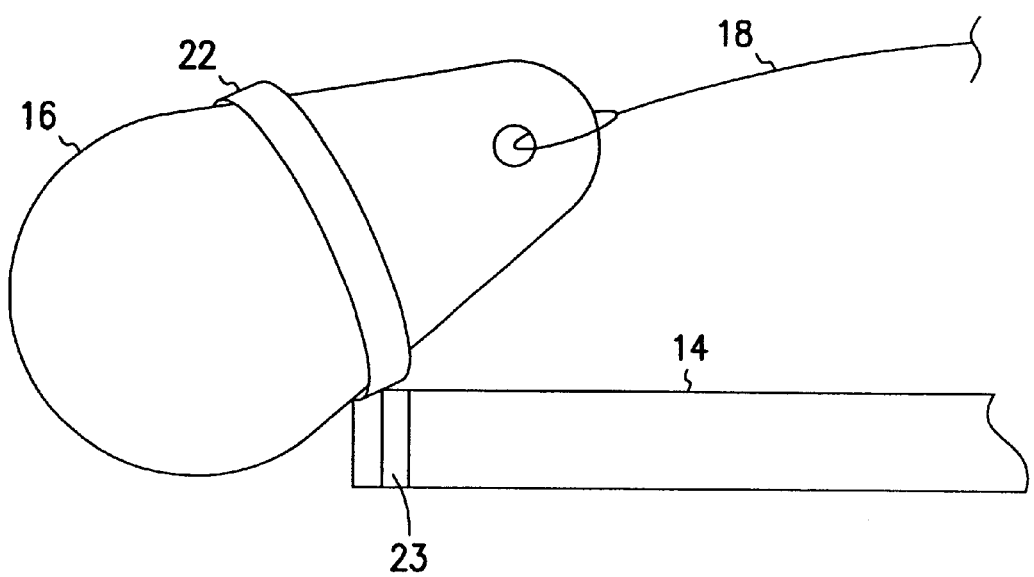
FIG. 7 is a detail view of another embodiment of the rod tip of an embodiment of the invention.

FIG. 7 is a detail view of the rod tip portion of an embodiment of rod 14 which enhances its operation in the casting mode. The forward eyelet or tip top 22 is enlarged so that the it encircles the tear drop shaped weight 16 nearer to its more bulbous mid section than its narrow tip in order to steady weight 16 prior to casting it from rod 14. The forward eyelet is also tilted from the normal position where the eyelet axis is generally aligned with the rod axis to a position where the axis of the eyelet 22 approaches a 90 degree angle to the axis of the rod so that when the rod is bowed prior to an automatic cast, the casting weight 16 is annularly supported by the eyelet 22 so that the casting force initially applied to the weight 16 is substantially aligned with the initial motion of the rod tip.

Conclusion

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the reconfiguration of the reel for the normal and automatic casting configuration can be accomplished by the switch shown in FIG. 3 or the adjustable front cover shown in FIG. 4 or by other means which provide for changing the operation of the thumb switch to allow for automatic casting in the automatic casting configuration and for normal casting in the conventional casting mode.

What is claimed is:

1. In a fishing reel having:
   a rear housing;
   a spool to hold a quantity of fishing line;
   a crank rotatably mounted on the housing;
   a rotor mounted on a shaft projecting through the spool, the rotor coupled to the crank for rotation by the crank and having a pickup pin extendable therefrom as the crank is rotated for engaging the fishing line and depositing it on the spool;
   a front cover attachable to the rear housing to enclose the spool and rotor, the cover having an opening through which fishing line may be fed to and from the spool
   a thumb button mounted on the housing and coupled for moving the shaft and rotor to retract the pickup pin into the rotor and to snub line between the rotor and the front cover, an improvement comprising:
      a switch mounted on the rear housing for limiting movement of the thumb button and the rotor to retract the pickup pin into the rotor without snubbing the line against the front cover.

2. A fishing reel comprising:
   a rear housing;
   a spool to hold a quantity of fishing line;
   a crank rotatably mounted on the housing;
   a rotor mounted on a shaft projecting through the spool, the rotor coupled to the crank for rotation by the crank and having a pickup pin extendable therefrom as the crank is rotated for engaging the fishing line and depositing it on the spool;
   a front cover attachable to the rear housing to enclose the spool and rotor, the cover having an opening through which fishing line may be fed to and from the spool
   a thumb button mounted on the housing and coupled in one configuration for moving the shaft and rotor to retract the pickup pin into the rotor and to snub line between the rotor and the front cover and coupled in another configuration to permit only limited movement of the thumb button and the rotor to retract the pickup pin into the rotor without snubbing the line against the front cover.

3. A rod and reel comprising a fishing rod having an eyelet at a distal tip thereof a spin casting reel mounted on the rod and displaced from its distal tip, the reel adapted for retrieving and discharging a fishing line having a weight at one end thereof through the eyelet, the reel constructed and arranged for retrieving the fishing line until the weight reaches the eyelet and then causing the rod to bend with the distal tip being drawn toward the reel;

the reel also being constructed and arranged for releasing the line by pressing a thumb button to momentarily release the line and dispense line as the bend in the rod is removed and the momentum of the weight propels the weight and the fishing line to which it is attached away from the rod and reel.

4. A method for casting a weight from a fishing rod comprising attaching the weight to the end of a fishing line from a fishing reel and passing through an eyelet at the end of the rod retrieving the fishing line to draw the weight against the eyelet and bend the rod tip toward the reel releasing the tension on the fishing line by pressing a thumb button to remove the tension on the fishing line and allow the rod to unbend and the momentum of the weight to propel it from the rod while pulling line from the reel.

5. In a fishing reel having:

a rear housing;

a spool to hold a quantity of fishing line;

a crank rotatably mounted on the housing;

a rotor mounted on a shaft projecting through the spool, the rotor coupled to the crank for rotation by the crank and having cusps along an edge thereof for engaging the fishing line and depositing it on the spool;

a front cover attachable to the rear housing to enclose the spool and rotor, the cover having an opening through which fishing line may be fed to and from the spool a thumb button mounted on the housing and coupled for moving the shaft and rotor to release the line from the cusps and to snub line between the rotor and the front cover, an improvement comprising:

a switch mounted on the rear housing for limiting movement of the thumb button and the rotor to allow release of the line from the cusps without snubbing the line against the front cover.

6. A fishing reel comprising:

a rear housing;

a spool to hold a quantity of fishing line;

a crank rotatably mounted on the housing;

a rotor mounted on a shaft projecting through the spool, the rotor coupled to the crank for rotation by the crank and having cusps along an edge thereof for engaging the fishing line and depositing it on the spool;

a front cover attachable to the rear housing to enclose the spool and rotor, the cover having an opening through which fishing line may be fed to and from the spool a thumb button mounted on the housing and coupled in one configuration for moving the shaft and rotor to release the line from the cusps and to snub line between the rotor and the front cover and coupled in another configuration to permit only limited movement of the thumb button and the rotor to release the line from the cusps without snubbing the line against the front cover.

* * * * *